Sept. 3, 1957 P. R. FINCH 2,804,772
CLINICAL THERMOMETER
Filed Sept. 11, 1953 2 Sheets-Sheet 1
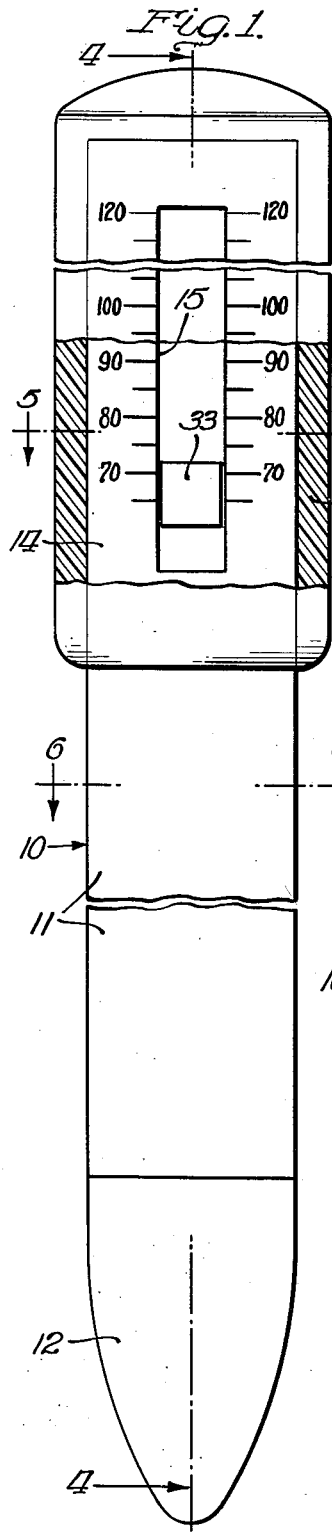
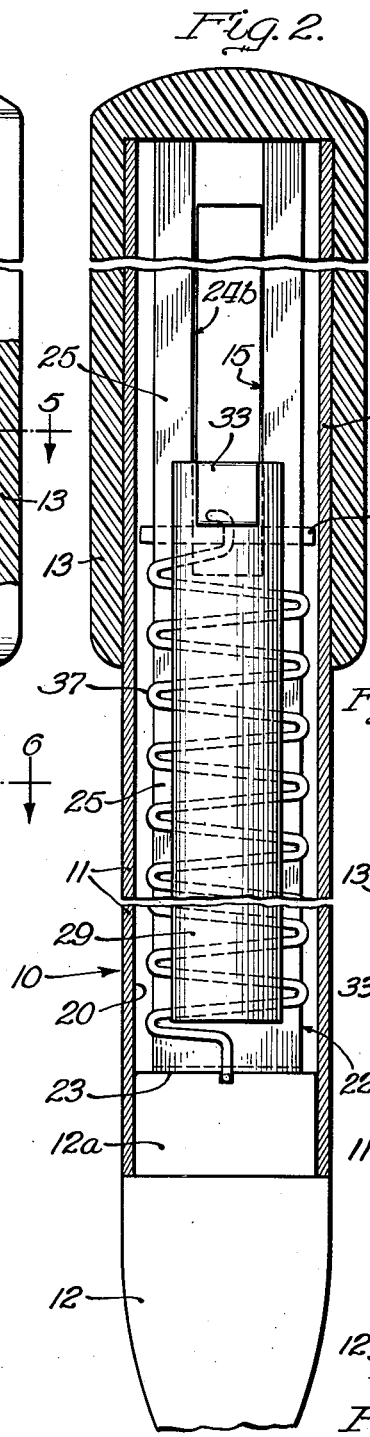
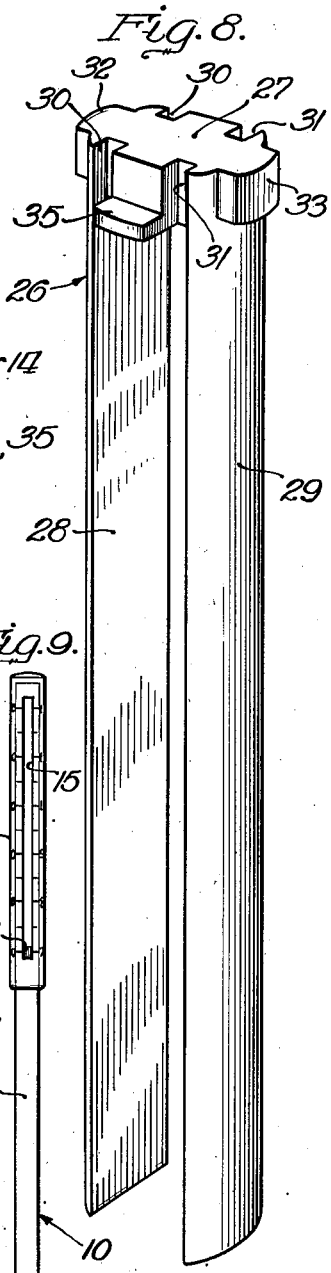
Inventor:
Percy R. Finch
By: *Attys.*

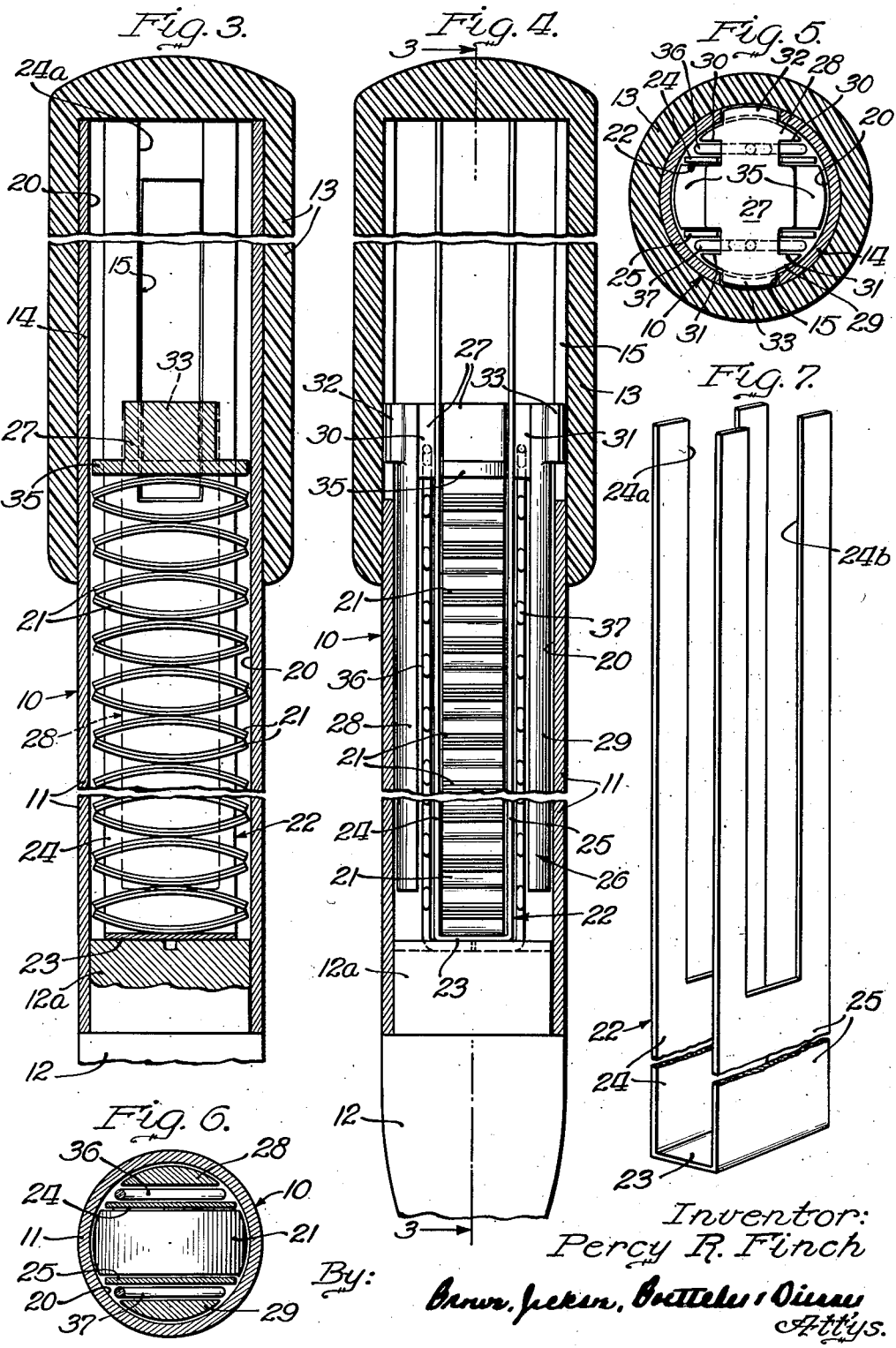

United States Patent Office 2,804,772
Patented Sept. 3, 1957

---

2,804,772

CLINICAL THERMOMETER

Percy R. Finch, Chicago, Ill., assignor to Joseph Lustfield, Chicago, Ill.

Application September 11, 1953, Serial No. 379,579

2 Claims. (Cl. 73—363)

---

This invention relates to a thermometer, and more particularly to a thermometer especially designed for measuring body temperatures.

One feature of the invention is that it provides an improved thermometer; another feature of the invention is that it provides a body temperature thermometer which gives an accurate reading in a very short period of time, as a few seconds; another feature of the invention is that it provides a body temperature thermometer having a heat conductive portion with a bore having heat deformable means therein, and an indicating member in the bore movable longitudinally of the bore as a function of deformation of the heat deformable means; a further feature of the invention is that the heat deformable means comprise a plurality of heat deformable members so positioned in the bore as to be deformed in directions longitudinal of the bore upon exposure to temperature variations; still another feature of the invention is that the heat deformable members comprise a plurality of arcuately formed plates positioned transversely in the bore and arranged in series relationship in a column to provide a total movement equal to the sum of the movements caused by deformatiton of each of said members upon temperature variations; yet a further feature of the invention is that the arcuate plates are arranged back-to-back in pairs, with a plurality of pairs being in series relationship in a column; and an additional feature of the invention is that it provides spring means for returning the indicating member to its normal position, this spring means alone having insufficient force to cause movement of the indicating member, so that the indicating member will remain in one position to enable a reading to be taken.

Other features and advantages of the improved thermometer will be apparent from the following description and from the drawings, in which:

Fig. 1 is an enlarged front elevational view, partly in section, of a thermometer constructed in accordance with the invention, portions of the thermometer intermediate its ends being broken away;

Fig. 2 is a fragmentary longitudinal sectional view through the thermometer of Fig. 1 with the heat deformable members removed;

Fig. 3 is a fragmentary longitudinal section at right angles to Fig. 2, taken along the line 3—3 of Fig. 4;

Fig. 4 is a fragmentary longitudinal section along the line 4—4 of Fig. 1;

Fig. 5 is a transverse section along the line 5—5 of Fig. 1;

Fig. 6 is a transverse section along the line 6—6 of Fig. 1;

Fig. 7 is a perspective of the guide means for the heat deformable members, a portion intermediate the ends being broken away;

Fig. 8 is a perspective view of the indicating member; and

Fig. 9 is a front elevational view of the thermometer.

Conventional body thermometers comprise a glass tube having a globule of mercury in an enlarged chamber or bulb portion at one end, a portion of the mercury extending up into a bore of very small cross sectional area in the tube. While instruments of this type are capable of providing accurate temperature readings, they are disadvantageous in that they generally require at least one minute, and often as much as two or three minutes, to reach an accurate reading. This results in a serious disadvantage in taking the body temperature of infants, and it results in an inconvenience in taking the body temperature of adults.

Another disadvantage of such conventional thermometers is that the glass tube, and particularly the thin-walled bulb which holds the globule of mercury, is easily shattered.

I have devised and am herewith disclosing and claiming an improved thermometer, particularly designed for taking body temperatures, which will provide an accurate temperature reading in only a very few seconds, and which may be constructed of stainless steel or other metal so that it is not shatterable and cannot easily be broken.

Referring now more particularly to the drawings, Fig. 9 provides an over-all view of the thermometer, which comprises an elongated metal casing designated generally at 10 and having a heat conductive portion 11, a tip 12 at one end, and a transparent cap 13 positioned over an indicating portion 14 (Figs. 1, 2, 3 and 4) at the other end of the casing. This indicating portion is provided with a viewing opening in the form of an elongated slot 15, and the casing has a scale thereon for providing a temperature reading as shown in Figs. 1 and 9.

In one embodiment of the thermometer which I have constructed, the casing has a diameter of about 3/16 of an inch and an over-all length of about 5⅛ inches. The tip 12 is about 5/16 of an inch long and is constructed of a solid piece of stainless steel. The rest of the casing comprises an integral tube of stainless steel, the portion 11 between the tip 12 and the cap 13 being about 2⅜ inches long and the cap 13 being about 2½ inches long and preferably being formed of nylon or other transparent plastic which is shrunk onto the casing. It will be understood that the above construction is merely illustrative, and the dimensions and materials specified are not all critical. While the particular materials specified are only illustrative, the casing or at least the portions 11 and 12 thereof, should be formed of heat conductive material.

Referring now more particularly to Figs. 1–8, the casing has a longitudinally extending bore 20 which is closed at one end by a shank 20a on the tip 12. A plurality of heat deformable members comprising arcuately formed plates 21 are positioned transversely in the bore so that they may be deformed in directions longitudinal of the bore 20 upon exposure to temperature variations. The members 21 preferably are bimetallic plates of well understood construction, being formed of two layers of different metals or other materials having different temperature-deformation characteristics, with the different layers so arranged that the arcuate plates will "hump" or form a curve of smaller radius when their temperature increases. The plates respond very quickly to temperature variations. As shown best in Fig. 3, the plates 21 are arranged back-to-back in pairs, a plurality of the pairs being in series relationship and abutting each other to form a column with the lower end adjacent the shank 12a of the tip 12. This construction provides a total movement (which appears as a movement at the top of free end of the column of plates 21 since the other end abuts the closed end of the bore 20) equal to the sum of the movements caused by deformation of each of the plates 21. By providing a construction wherein the deformation of the plates is cumulative, I am enabled to provide a relatively large size scale which may be easily read with accuracy despite the fact that each plate 21 may move only a small fraction of an inch when its temperature changes a few degrees. In one embodiment, I provide 60 plates arranged in series relationship in a column formed of 30 pairs of plates, each pair comprising two plates arranged back-to-back. The total movement at the top of the column is about 60 times greater than the movement of each plate.

In order to insure against misalignment or jamming of the plates 21 in the column, I provide guide means in the form of an elongated member designated generally at 22 in Fig. 7. This member is formed as a U or channel, with a base 23 and elongated parallel arms 24 and 25, each of which is provided with a centrally disposed elongated longitudinally extending slot 24a and 24b, respectively. As may be seen best in Fig. 6, the column of plates 21 is guided between the arms 24 and 25.

The thermometer is provided with an indicating member which is designated generally at 26 in Fig. 8. This indicating member preferably is formed of a plastic and has a base 27 and parallel spaced elongated arms 28 and 29. The base 27 is formed with oppositely facing slots 30 and 31 in its sides in which the respective arms 24 and 25 of the guide member are positioned as shown best in Figs. 5 and 6, and the indicating member is provided with oppositely facing indicating faces 32 and 33 which project through the slots 24a and 24b in the guide member and one of which extends opposite the viewing opening 15 in the casing. If desired, oppositely disposed viewing openings may be provided in the casing. A flange 35 on the indicating member is provided so that the indicating member is supported atop the column of heat deformable plates 21 as shown in Figs. 3 and 4, and spring means are connected between the indicating member 26 and the casing adjacent the tip 12 to provide a yieldable force urging the indicating member toward the closed end of the bore 20. This spring means comprises a pair of light springs 36 and 37 which are anchored at their top end in the base 27 of the indicating member and are anchored at their bottom end in the tip shank 12a. As shown in Figs. 2 and 4, the springs are not coiled, but are of zig-zag conformation and are positioned in the space between the respective arms of the guide member 22 and the respective arms of the indicating member 26. The springs are so light that they alone have insufficient force to cause movement of the indicating member, so that the indicating member will not move to a lower position after the thermometer is removed from the body opening in which it was positioned to obtain a temperature reading. When the thermometer is shaken to intermittently relieve friction between the various parts, the springs will insure that the parts return to their normal position so that the indicating face 33 is at or near the lower end of the slot 15 at normal room temperature, as shown in Figs. 1 and 2.

In the operation of the thermometer, the tip 12 and the indicating portion 11 of the casing are inserted into a body opening of a person whose temperature is to be taken and body heat is rapidly conducted through the heat conductive casing to the heat deformable plates 21. These plates "hump" in accordance with the amount of body heat, so that the column of plates is lengthened or stretched, the movement of each plurality of plates 21 being cumulative so that the top of the column of plates and the indicating member carried thereon are moved a disatnce equal to the total movement caused by deformation of all of the plurality of plates. Because the casing is of heat conductive material and because of the rapid action of the bi-metallic plates used, this movement occurs in only a very few seconds, and it is not necessary to leave the thermometer in the body opening for more than a few seconds. When the thermometer is removed, a temperature reading may readily be obtained by noting the position along the scale of the top of the indicating surface 33 (which surface is preferably colored red or some other bright color). The friction of the parts prevents the indicator from moving down on the scale despite the fact that the column of heat deformable plates may contract in length when the thermometer is exposed to room temperature. However, if the thermometer is shaken, as is done with conventional mercury body thermometers, the springs 36 and 37 will cause the indicating member to move down until it rests on the top of the column of heat deformable members, where it gives a reading of the temperature of the surrounding atmosphere.

While the scale is shown as being formed on the surface of the casing, it might, of course, be formed on the nylon cap 13, or it might be formed on the indicator itself, with a line or other indicating means on the casing or cap to provide an accurate reading.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A body temperature thermometer of the character described, comprising; an elongated heat conductive generally cylindrical casing having a longitudinal bore closed at one end by a generally tapered and rounded tip, said casing having a veiwing opening at its other end with a temperature indicating scale along said opening, guide arms extending longitudinally within said casing, a temperature indicating member guided longitudinally in said casing by said guide arms and exposed through said viewing opening to indicate temperatures on said scale, and a plurality of reversely bowed bimetallic elements disposed between said guide arms, said bowed bimetallic elements coacting at their outer ends and bowed apart intermediate their ends with the intermediate bowed portion at one end of said plurality of reversely bowed bimetallic elements directly coacting with said tip and the intermediate bowed portion at the other end directly coacting with said temperature indicating element, the intermediate bowed portions of adjacent pairs of bimetallic elements coacting with each other to form thermal actuating means extending from said tip to said indicating member and providing a total movement equal to the sum of movements of said pairs of bimetallic elements.

2. A body temperature thermometer according to claim 1 wherein the temperature indicating member has parallel spaced and longitudinally extending guide arms straddling said bowed bimetallic elements at substantially right angles to said first mentioned guide arms.

References Cited in the file of this patent

UNITED STATES PATENTS

| 1,466,886 | Moore | Sept. 4, 1923 |
| 1,635,555 | MacGregor | July 12, 1927 |
| 1,695,838 | Barker | Dec. 18, 1928 |
| 2,117,287 | Bloch | May 17, 1938 |
| 2,321,846 | Obermaier | June 15, 1943 |

FOREIGN PATENTS

| 893,844 | France | Nov. 2, 1944 |
| 21,335 | Great Britain | Oct. 24, 1901 |